United States Patent
Seick et al.

(10) Patent No.: US 6,975,884 B2
(45) Date of Patent: Dec. 13, 2005

(54) WIRELESS LOCAL AREA NETWORK VEHICULAR ADAPTER

(75) Inventors: Ryan E. Seick, Palatine, IL (US); Michael W. Bychowsky, Crystal Lake, IL (US); Michelle L. Herrell, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 139 days.

(21) Appl. No.: 10/644,504

(22) Filed: Aug. 20, 2003

(65) Prior Publication Data

US 2005/0054400 A1    Mar. 10, 2005

(51) Int. Cl.[7] .............................. H04B 1/38; H04M 1/00
(52) U.S. Cl. .................. 455/559; 455/557; 455/569.2; 455/572
(58) Field of Search .............................. 455/557, 556.1, 455/559, 41.1, 41.2, 41.3, 569.1, 569.2, 573, 455/572, 575.9, 575.1, 575.6, 90.3, 66.1, 455/517, 344, 345, 346, 426.1, 454, 74.1, 455/88; 320/115

(56) References Cited

U.S. PATENT DOCUMENTS

| | | | |
|---|---|---|---|
| 4,700,375 A | 10/1987 | Reed | |
| 6,255,800 B1 * | 7/2001 | Bork | .......................... 455/463 |
| 6,344,727 B1 | 2/2002 | Desai et al. | |
| 6,509,659 B1 | 1/2003 | Carroll et al. | |
| 6,693,517 B2 * | 2/2004 | McCarthy et al. | ....... 340/425.5 |
| 2001/0049262 A1 | 12/2001 | Lehtonen | |
| 2002/0197954 A1 * | 12/2002 | Schmitt et al. | ............ 455/41.1 |

OTHER PUBLICATIONS

Jabra Corporation "FreeSpeak™ BT200".

* cited by examiner

*Primary Examiner*—Eliseo Ramos-Feliciano
(74) *Attorney, Agent, or Firm*—Brian M. Mancini; Terri S. Hughes

(57) ABSTRACT

A vehicular adapter system is described having wireless local area network (WLAN) capabilities. The adapter system includes an adapter configured to plug into a cigarette lighter socket of a vehicle. The adapter has a WLAN module contained therein, and is configured to electrically couple the WLAN module to a wireless communication device. The WLAN module is operable to communicate with other WLAN-enabled devices in the vehicle, such as a head unit with another embedded WLAN module. The interoperability of the WLAN modules provide hands-free audio operation of a radiotelephone that is not WLAN-enabled using existing vehicular audio transducers.

17 Claims, 2 Drawing Sheets

WIRELESS LOCAL AREA NETWORK VEHICULAR ADAPTER

FIELD OF THE INVENTION

This invention is generally directed to local area network communications, and specifically to local area network communications in a vehicle.

BACKGROUND OF THE INVENTION

There has recently been a push to require radiotelephone users in vehicles to communicate using a "hands-free" mode for safety purposes. The hands-free mode basically allows a user to communicate over their radiotelephone without having to hold the radiotelephone up to their ear, i.e. without having to use their hands. This leaves the user's hands free to control the vehicle.

There have been several prior art techniques implemented to provide a hands-free operation. Typically, these techniques require a radiotelephone with available audio input/output (I/O) jacks and various accessories to take advantage of available audio I/O in the phone. For example, many radiotelephones include jacks for a microphone and speaker(s). This available audio I/O allows a user to wear a headset containing speakers electrically connected to the speaker jacks of the phone and containing a microphone electrically connected the microphone jack. In this way, the headset coupled with the audio I/O of the radiotelephone allows hands-free operation of the phone. However, this technique requires the purchase of the headset which adds significant cost. In addition, a user must still place the headset on their head when communicating, which negates some of the hands-free benefit, and the use of many wires could be cumbersome for the user to connect.

Another prior art technique also uses the audio I/O of a radiotelephone to connect a loudspeaker and high gain microphone which connects directly to the phone. The loudspeaker and microphone can be part of a single module or can be separate. For example, a single loudspeaker/microphone module can be plugged directly into the audio I/O of the phone, and a user can communication without either of the loudspeaker or microphone being located near their head. In addition, the module or individual speaker and microphone can be powered directly from the phone or be self-powered. This technique allows hands-free communication, but still requires the purchase of the audio module which adds significant cost. Moreover, the module must necessarily consume more power as the loudspeaker and microphone are located remotely from the user, requiring more amplification to be heard. In particular, if powered from the phone, the module will reduce battery life and thus talk time of the phone, and if powered separately, a separate battery will need to be purchased which will typically fail a different times than when the phone need recharging, inconveniencing the user.

Another prior art techniques uses wireless techniques to transceiver audio signals between a communication device and an audio device. Such wireless connection can be provided between infrared ports of the communication device and the audio device, or can be provided by radio frequency networks (i.e. local area networks) of several types as are commonly known by the generic or trade names LAN, WLAN, WAP, WiFi, Bluetooth™ and the like, herein collectively referred to as wireless local area networks or WLAN. These wireless techniques all suffer from the need to have a updated radiotelephone capable of LAN communication, and the need to have additional audio hands-free accessories. Unfortunately, many users have older-style phones without WLAN capability. Moreover, users may not wish to purchase such an adapted phone nor the needed WLAN audio accessories to operate in hands-free mode.

Therefore, what is needed is technique to provide a hands-free operational mode for existing radiotelephones without WLAN communication capability. It would also be of beneficial to provide hands-free operation without the need to purchase additional audio accessories. It would also be an advantage to provide this benefit for minimal cost.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENT

The present invention describes a system that provides a hands-free operational mode for existing radiotelephones without WLAN communication capability. This benefit is achieved at minimal cost without the need to purchase additional audio accessories. In particular, the present invention can take advantage of those vehicles having radio or stereophonic systems equipped with the capability of WLAN communication.

The present invention is applicable to all communication devices operable in a vehicle. As described below, the present invention provides freedom of use in a vehicle without any need for previous installation. Moreover the WLAN capability introduced does not rely on power from the communication device nor any internal cell, instead depending on power from the vehicle. Moreover, accessory audio devices are not needed as these are already supplied in the vehicle. The only operating limitations are that the vehicle head unit have WLAN capability and the phone be operable in a hands-free mode. Many existing radiotelephone already have a hands free profile for use with purchased accessories. The present invention takes advantage of these abilities to provide a solution for the problem of non-WLAN enabled phones, as will be described below.

Figure 1:
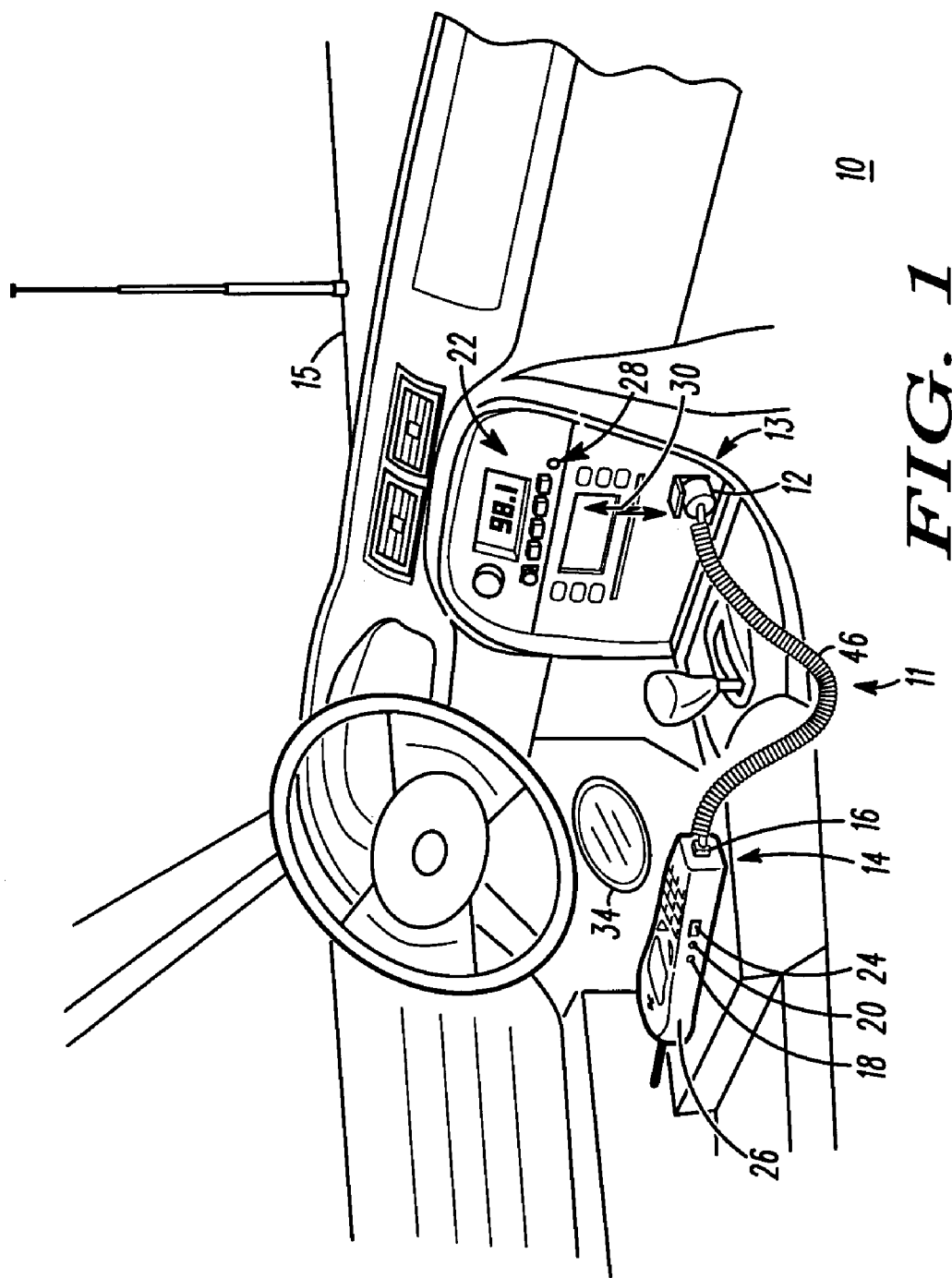
FIG. 1 is a perspective view of a preferred embodiment of the present invention.
Figure 2:
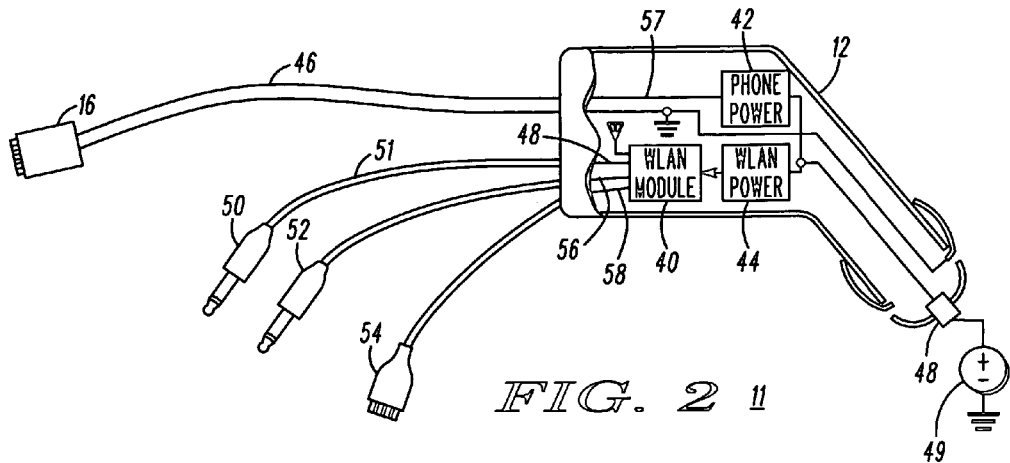
FIG. 2 is a cutaway view of the adapter of FIG. 1 demonstrating various embodiments of the present invention.
Figure 3:
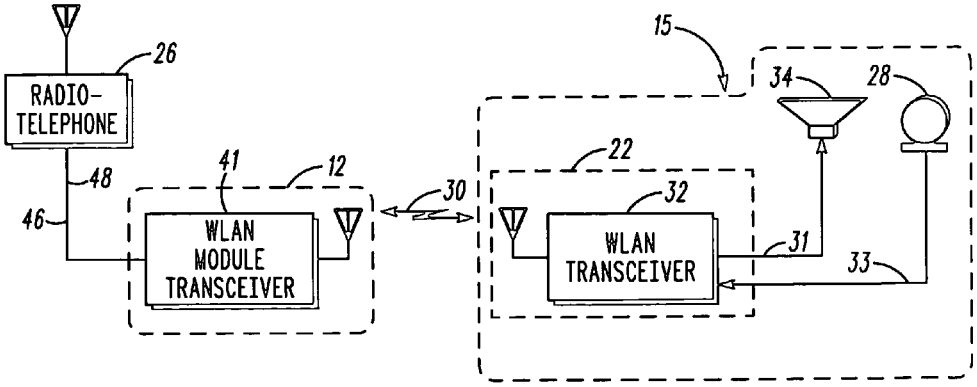
FIG. 3 is a block diagram showing the operation of the system of FIG. 1, in accordance with the present invention.

FIGS. 1–3 show a vehicular adapter system 10 having wireless local area network (WLAN) capabilities. The adapter system includes an adapter 11 configured to plug into a cigarette lighter socket 13 of a vehicle 15. Preferably, the socket 13 is of a standard cigarette lighter configuration. The adapter 11 includes a first plug 12 that plugs into the socket 13, a second plug 16 that plugs into the radiotelephone 26, and a cord 46 containing various connections as will be detailed below.

The adapter 11 itself has a local area network (WLAN) module 40 contained therein. In particular the WLAN module 40 includes a transceiver 41 able to transmit and receive signals 30 in accordance with the particular WLAN protocol, as is known in the art. Preferably, the WLAN protocol is a Bluetooth™ protocol. The adapter 11 includes a standard plug 12 to plug into the cigarette lighter socket 13 and a plug configured to connect to a charging/audio/data port 14 of a specific radio communication device 26.

The adaptor 11 is configured to electrically couple the WLAN module 40 to the wireless radio communication device 26. As the module operates in accordance with known WLAN protocols, it is operable to communicate with other WLAN-enabled devices (e.g. 32 of FIG. 3). In particular, the WLAN module 40 of the adapter 11 is able to communicate with a similarly WLAN-enabled transceiver module 32 embedded in a head unit 22 of the vehicle 15. For example, the head unit 22 is a stereophonic reproduction device able to reproduce stereophonic music that is broadcast to the vehicle radio or obtained from recording media. In the present invention, the head unit is also used to transceiver voice, music, or data as explained herein.

The adapter 11 is also configured to power 44 the WLAN module 40 of the adapter 11 from the power available 48 from the cigarette lighter socket of the vehicle. This configuration can include a voltage conversion device 44, such as a voltage regulator, DC—DC converter, or the like, to provide the proper operating voltage for the module 40 from the vehicle battery 49 voltage (e.g. twelve volts). The adapter 11 is also configured to power 42 and charge the radio communication device 26. This can include a separate voltage conversion device 42 to provide the proper operating voltage for the phone and its battery, or the same voltage conversion device 44 as that for the WLAN module 40, if the operating voltages of the wireless communication device 26 and its battery are similar to that of the WLAN module 40. Of course, if the communication device 26 or the WLAN module 40 have the same operating voltage as the vehicle 15 then no voltage conversion device is needed.

In accordance to one embodiment of the present invention, the adapter 11 couples audio signals 48 from the wireless communication device to the WLAN module. Typically, audio I/O signals 48, 56 (and data signals 58) are available along with access to the phone power circuits through the common jack 14 on the phone 26. In this case, the charging current 57 and audio signal 48 run through the cord 46 and the plug 16 to the common socket 14. Optionally, if audio I/O ports are not available on the common jack 14, the present invention provides for the use of separate cables 50, 52, 54 that connect to one or more audio and data I/O jacks of the radiotelephone. For example, a first cable 50 could be provided to connect audio signals 48 to the module 40 from an audio (speaker) output 18 of the radiotelephone 26. These audio signals 48 can be monophonic or stereophonic with the appropriate cable plug 50 being supplied. These audio signals 48 can also be voice or music. In this scenario, the microphone of the radiotelephone serves as the audio input to a network service provider and the loudspeaker(s) 34 of the vehicle 15 serve as the audio output from the network service provider. Preferably, the radiotelephone 26 has a high gain mode for its microphone in this mode of hands-free operation.

Optionally, a second cable 52 could be provided to connect audio signals 56 from the module 40 to an audio (microphone) input 20 of the radiotelephone. Preferably, the module 40 provides full duplex operation of audio. In another option, the adapter 11 could include cabling 54 to provide data 58 to the module 40 through a data jack 24 (e.g. USB port). Such a transfer of data 58 could be operable in half-duplex or full-duplex mode.

Referring to FIGS. 2 and 3, the module transceiver 41 provides WLAN communication 30 with other WLAN-enabled devices 32 in the vehicle 15. Preferably, the vehicle 15 includes a head unit 22 coupled to at least one audio output transducer in the vehicle 15, such as existing loudspeakers 34 for example. In particular, the head unit 22 includes a second WLAN module 32 operable to wirelessly communicate 30 with the adapter WLAN module 41. In this way, audio signals 48 generated in the radiotelephone 26 are electrically coupled to the module transceiver 41 through the plug 16 (or optionally 50) and cabling 46 (or optionally 51) to the adapter WLAN module 40, which wirelessly transmits 39 the audio signals (after appropriate modulation) to the WLAN module 32 of the head unit 22, which demodulates the WLAN signal back to baseband (audio), whereupon the head unit 22 transfers the audio signals 31 from the head unit WLAN module 22 to the loudspeaker(s) 34 of the vehicle 15.

More preferably, the head unit 22 includes a connection to at least one audio input transducer in the vehicle 15, such as an existing a microphone 28 for example. Preferably, the microphone 28 is integral to the head unit 22. In this instance, the head unit WLAN module 32 receives audio signals 33 input from the microphone 28 and modulates the audio signals 33 and wirelessly transmits this signal 30 to the adapter WLAN module 41, which demodulates the audio and transfers the audio signals 48 from the adapter 12 to the wireless communication device 26. The wireless communication device transceives audio signals between it and a network service provider, and presumably a subsequent end user or network, using known wireless communication protocols. Preferably, data signals could also be accommodated, such as for programming the head unit, storage of content in the head unit, or downloading information to or from the head unit, for example.

In summary, the present invention describes a system that provides a hands-free operational mode for existing radiotelephones not having WLAN communication capability. This benefit is achieved at minimal cost through the use of an cigarette adapter that includes a WLAN module contained therein, and which can provide power to both the radiotelephone and WLAN module from the vehicle battery. In particular, the present invention can take advantage of those vehicles having head units equipped with the capability of WLAN communication.

It should be recognized that the present invention could be implemented in all wireless/cordless communication devices, such as radiotelephone products, and portable computing devices such as PCs and PDAs to provide WLAN capabilities in a vehicle.

While specific components and functions of the present invention are described above, fewer or additional functions could be employed by one skilled in the art and be within the broad scope of the present invention. The invention should be limited only by the appended claims.

What is claimed is:

1. A vehicular adapter system having wireless local area network (WLAN) capabilities, the adapter system comprising:

an adapter configured to plug into a cigarette lighter socket of a vehicle, the adapter having a local area network (WLAN) module contained therein, a common I/O plug for connecting to a common I/O jack of a wireless communication device, and separate audio cables for connecting to separate audio jacks of the wireless communication device, the adaptor being configured to electrically couple the WLAN module to a wireless communication device through at least one of the group of the common I/O plug and the separate audio cables such that the module operable to audio communicate with other WLAN-enabled devices.

2. The system of claim 1, wherein the adapter is operable to power one or more of the WLAN module and the wireless communication device.

3. The system of claim 1, further comprising a head unit coupled to loudspeakers in the vehicle, the head unit including a second WLAN module operable to wirelessly communicate with the adapter WLAN module.

4. The system of claim 3, wherein the adapter WLAN module wirelessly transmits the audio signals to the second WLAN module whereupon the head unit transfer the audio signals from the second WLAN module to the vehicular loudspeakers.

5. The system of claim 3, wherein the head unit is coupled to a microphone in the vehicle, and wherein the second WLAN module wirelessly transmits audio signals from the microphone to the adapter WLAN module, and wherein the adapter WLAN module transfers the audio signals from the adapter WLAN module to the wireless communication device.

6. The system of claim 1, wherein the WLAN module is operable under a Bluetooth transceiver protocol.

7. The system of claim 1, wherein the adapter includes a separate data cable for connecting to a data jack of the wireless communication device wherein the WLAN module is operable to communicate data through one of the group of the common I/O plug and the separate data cable such that the WLAN module is operable to transmit data from the wireless communication device.

8. A vehicular adapter system having wireless local area network (WLAN) capabilities, the adapter system comprising:
an adapter configured to plug into a cigarette lighter socket of a vehicle, the adapter having a wireless local area network (WLAN) module contained therein, a common I/O plug for connecting to a common I/O jack of a wireless communication device, and separate audio cables for connecting to separate audio jacks of the wireless communication device, the adaptor being configured to electrically couple the WLAN module to a wireless communication device through at least one of thereupon of the common I/O plug and the separate audio cables such that the module operable to communicate with other WLAN-enabled devices;
a second WLAN module embedded in a head unit of the vehicle, the second WLAN module operable to wirelessly communicate with the adapter WLAN module; and
at least one audio transducer coupled to the head unit.

9. The system of claim 8, wherein the adapter is operable to power the WLAN module and to power and charge the wireless communication device.

10. The system of claim 9, wherein the at least one audio transducer includes at least one loudspeaker, wherein the adapter electrically couples audio signals from the wireless communication to the adapter WLAN module, and wherein the adapter WLAN module wirelessly transmits the audio signals to the second WLAN module whereupon the head unit transfers the audio signals from the second WLAN module to the at least one vehicular loudspeaker.

11. The system of claim 9, wherein the at least one audio transducer includes a microphone, wherein the second WLAN module wirelessly transmits audio signals from the microphone to the adapter WLAN module, and wherein the adapter WLAN module transfers the audio signals from the adapter WLAN module to the wireless communication device.

12. The system of claim 9, wherein the WLAN modules are operable under a Bluetooth transceiver protocol.

13. The system of claim 9, wherein the adapter includes a separate data cable for connecting to a data jack of the wireless communication device wherein the WLAN module is operable to communicate data through one of the group of the common I/O plug and the separate data cable such that the WLAN modules are operable to transmit data between the wireless communication device and the head unit.

14. A vehicular adapter system having wireless local area network (WLAN) capabilities, the adapter system comprising:
an adapter configured to plug into a cigarette lighter socket of a vehicle, the adapter having a wireless local area network (WLAN) module contained therein a common I/O plug for connecting to a common I/O jack of a wireless communication device, and separate audio cables for connecting to separate audio jacks of the wireless communication device, the adapter is operable to power both the WLAN module and the wireless communication device, the adaptor being configured to electrically couple the WLAN module to the wireless communication device through at least one of the group of the common I/O plug and the separate audio cables such that the module is operable to communicate audio signals from the wireless communication device to other WLAN-enabled devices; and
a second WLAN module embedded in a head unit of the vehicle, the head unit coupled to at least one loudspeaker and a microphone, the second WLAN module operable to wirelessly communicate with the adapter WLAN module.

15. The system of claim 14, wherein the WLAN modules are operable to transfer audio signals from the wireless communication device to the adapter WLAN module to the second WLAN module of the head unit to at least one loudspeaker and audio signals from the microphone coupled to the head unit to the second WEAN module to the adapter WLAN module to the wireless communication device.

16. The system of claim 14, wherein the WLAN modifies are operable under a Bluetooth transceiver protocol.

17. The system of claim 14, wherein the adapter includes a separate data cable for connecting to a data jack of the wireless communication device wherein the WLAN module is operable to communicate data through one of the group of the common I/O plug and the separate data cable such that the WLAN modules are operable to transmit data between the wireless communication device and the head unit.

* * * * *

UNITED STATES PATENT AND TRADEMARK OFFICE
CERTIFICATE OF CORRECTION

PATENT NO. : 6,975,884 B2  
APPLICATION NO. : 10/644504  
DATED : December 13, 2005  
INVENTOR(S) : Seick et al.

Page 1 of 1

It is certified that error appears in the above-identified patent and that said Letters Patent is hereby corrected as shown below:

Column 5  
In claim 8, line 47, change "thereupon" to --the group--

Column 5  
In claim 10, line 58, change "claim 9" to --claim 8--

Column 6  
In claim 11, line 5, change "claim 9" to --claim 8--

Column 6  
In claim 12, line 12, change "claim 9" to --claim 8--

Column 6  
In claim 13, line 14, change "claim 9" to --claim 8--

Column 6  
In claim 14, line 26, change "therein" to --therein,--

Column 6  
In claim 15, line 49, change "WEAN" to --WLAN--

Column 6  
In claim 16, line 51, change "modifies" to --modules--

Signed and Sealed this

Twenty-eighth Day of November, 2006

JON W. DUDAS  
*Director of the United States Patent and Trademark Office*